United States Patent Office 2,995,517
Patented Aug. 8, 1961

2,995,517
FERRITES CONTAINING NIOBIUM
Charles O'Hara, Blisworth, England, assignor to The Plessey Company Limited, Ilford, England, a British company
No Drawing. Filed Jan. 25, 1957, Ser. No. 636,246
Claims priority, application Great Britain Feb. 16, 1956
2 Claims. (Cl. 252—62.5)

This invention relates to the manufacture of ferrites and more particularly of ferromagnetic ferrites and has for an object to provide an improved ferrite which for a given firing schedule has an increased density and to provide a given density by firing at a lower temperature than hitherto necessary.

Ferrites are a group of compounds with the general chemical formula $MFe_2O_4$, where M can be one or more of the divalent metals such as Co, Ni, Mg, Mn and Zn.

By suitable choice of the divalent metals and, to a certain extent, of the conditions of preparation ferromagnetic ferrites can be obtained covering a wide range of magnetic applications. One of the methods of preparation as hitherto employed comprises pre-sintering a mixture of the metallic oxides at about 1100° C. and, after cooling, grinding and sieving the mixture, pressing the required shape, and sintering again. In order to obtain a high density in the finished product, it is usually found that high sintering temperatures and long sintering times are required. The invention consists in the addition of a small quantity, namely 0.1 to 5 mol. percent, preferably about 1 mol. percent, of niobium pentoxide ($Nb_2O_5$) to the ferrite composition. The addition does not substantially affect the magnetic properties of the fired ferrite except in so far as it acts as a non-magnetic diluent; and as the quantity involved is only about 1%, the dilution effect is so small as to be negligible for most practical applications. The ferrites obtained, which are characterized by a content of between 0.1 and 5 mol. percent, preferably approx. 1 mol. percent, of niobium pentoxide, form also an aspect of the invention. They are of particular value in "soft" magnetic bodies, i.e. magnetic bodies having a "slim" hysteresis loop corresponding to low hysteresis loss, such as bodies used for example in transformer cores, where the increased physical density allows a greater flux density to be used without reaching saturation, and without increasing the magnetic losses.

On the other hand the possibility of obtaining according to the invention a given density at a lower temperature than was hitherto required is of particular value in bodies containing the more refractory oxides, such as chromium oxides, which hitherto required exceptionally high firing temperatures to give their maximum densities.

*Examples*

(1) A composition containing 0.49 mol. nickel oxide (NiO), 0.01 mol. cobalt oxide (CoO), 0.10 mol. chromium oxide ($Cr_2O_3$), and 0.40 mol. ferric oxide ($Fe_2O_3$) was prepared in the following way:

The metal oxides, which had a particle size of about 5 microns, were weighed out into a ballmill, and water was added to form a slurry. The mixture was ballmilled for several hours. After drying and sieving, the powder was sintered at 1150° C. for 2 hours in a shallow dish, and then was cooled slowly. The powder was placed in a ballmill together with 0.01 mol. of niobium pentoxide, acetone was added to form a slurry, and the mixture was milled for 1 hour. A plastic binder soluble in acetone (such as butyl methacrylate) was added, and the milling was continued for 1 hour. The mixture was dried, granulated and sieved, and specimens were pressed at 5 tons/sq. in. After firing at 1360° C. for 24 hours the density was found to be 5.09 gm./cc.

In the case of a composition which was identical except that no niobium pentoxide was added, the density after the same firing schedule was 4.36 gm./cc.

(2) A composition containing 0.49 mol. nickel oxide, 0.01 mol. cobalt oxide, 0.20 mol. chromium oxide, and 0.30 mol. ferric oxide, was prepared by the same method as above except that the quantity of niobium pentoxide added after the first firing and before the second milling was 0.005 mol. When fired at 1350° C. for 24 hours the density was 4.74 gm./cc. A composition which was identical except that no niobium pentoxide was added gave a density of 4.08 gm./cc. when fired to the same schedule.

What I claim is:

1. A shaped and fired, ferromagnetic nickel ferrite of the formula $x(NiO,M''O).yM''{'}_2O_3$ where $M''O$ is a bivalent metal oxide selected from the group consisting of CoO, MgO, MnO and ZnO and mixtures thereof, where $M''{'}_2O_3$ is selected from the group consisting of $Fe_2O_3$, and mixtures of $Fe_2O_3$ and $Cr_2O_3$ and where $x{:}y$ is approximately 1:1, said ferrite containing in addition 0.1 to 5 mol. percent of niobium pentoxide and being characterized in having a substantially greater density than a ferrite free of niobium said ferrite having been prepared by presintering at least a portion of the ferric oxide and nickel oxide, grinding the presintered compound, mixing the niobium pentoxide therewith, molding and firing the resultant mixture at about 1350–1360° C.

2. A shaped and fired, ferromagnetic nickel ferrite of the formula $(NiO, CoO).(Fe_2O_3, Cr_2O_3)$ where NiO is approximately 49 mol. percent, CoO is approximately 1 mol. percent, $Fe_2O_3$ is 40–30 mol. percent and $Cr_2O_3$ is about 10–20 mol. percent, said ferrite containing in addition 0.1 to 5 mol. percent of niobium pentoxide and being characterized in having a substantially greater density than a ferrite free of niobium said ferrite having been prepared by presintering at least a portion of the ferric oxide and nickel oxide, grinding the presintered compound, mixing the niobium pentoxide therewith, molding and firing the resultant mixture at about 1350–1360° C.

References Cited in the file of this patent

UNITED STATES PATENTS

| | | |
|---|---|---|
| 2,584,324 | Bousky | Feb. 5, 1952 |
| 2,659,698 | Berge | Nov. 17, 1953 |
| 2,744,873 | Piekarski | May 8, 1956 |

FOREIGN PATENTS

| | | |
|---|---|---|
| 756,383 | Germany | Oct. 20, 1952 |
| 735,375 | Great Britain | Aug. 17, 1955 |
| 737,284 | Great Britain | Sept. 21, 1955 |
| 752,659 | Great Britain | July 11, 1956 |
| 756,374 | Great Britain | Sept. 5, 1956 |

OTHER REFERENCES

Economos: J. Amer. Ceramic Soc., October 1935, p. 354.

Gorter: Philips Research Reports, December 1954, p. 441.

Weil et al.: Comptes Rendus, v. 234, p. 1352 (1952).

Kordes et al.: Chem. Abs., vol. 46, col. 4411, May 25, 1952.